Oct. 27, 1925.
C. B. SPASE
EQUALIZING CLUTCH
Filed June 12, 1923
1,559,527
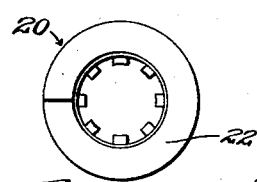
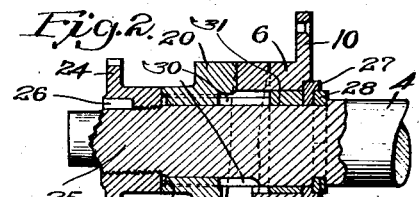
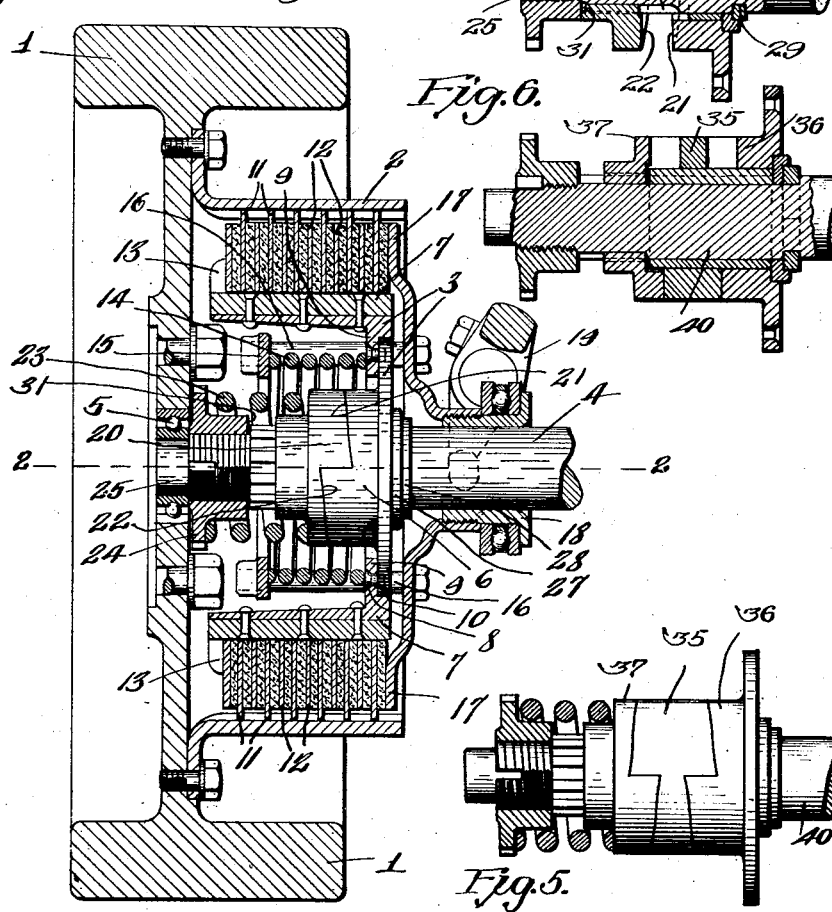
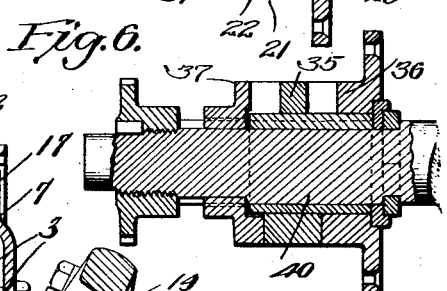
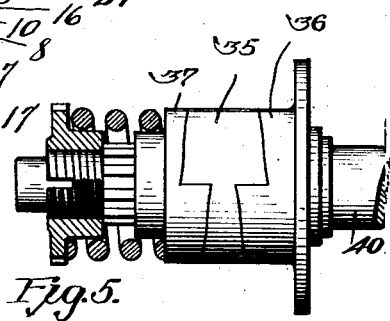
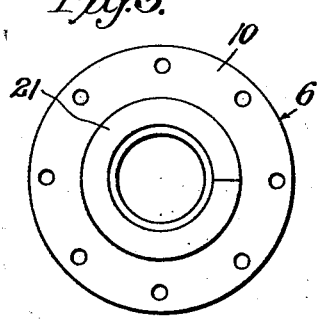
Charles B. Spase, INVENTOR.
BY
ATTORNEYS.

Patented Oct. 27, 1925.

1,559,527

UNITED STATES PATENT OFFICE.

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK.

EQUALIZING CLUTCH.

Application filed June 12, 1923. Serial No. 644,883.

*To all whom it may concern:*

Be it known that I, CHARLES B. SPASE, a citizen of the United States, residing at Syracuse, in the county of Onondaga and State of New York, have invented a certain new and useful Equalizing Clutch, of which the following is a specification.

This invention relates to friction clutches, such as are used in motor vehicles and has for its object a clutch having embodied or built thereto, as a part thereof, means for equalizing the power delivered to the driven shaft and preventing the sudden application of power to the driven shaft when the power of the driving element of the clutch becomes suddenly greater than can be received by or transmitted to the driven shaft, as when a quick start is made with the engine running at too great a speed or when the engine is too quickly accelerated, or when the driven shaft acting as a driver, (as when coasting down hill with the clutch off), is rotating at a greater rate of speed than can be received by the driving element of the clutch and the engine, when the clutch is again engaged.

The invention consists in the novel features and in the combinations and the constructions and the arrangement of parts as hereinafter set forth and claimed.

In describing this invention, reference is had to the accompanying drawings in which like characters designate corresponding parts in all the views.

Figure 1 is a sectional view of one form of clutch embodying this invention.

Figure 2 is a vertical, longitudinal, sectional view through one of the cams, and the contiguous portion of the driven shaft.

Figures 3 and 4 are opposite face views of the cams.

Figure 5 is a fragmentary elevation of another form of the equalizing motion transmitting means.

Figure 6 is a longitudinal, sectional view of parts seen in Figure 5.

This clutch comprises a driving element and a driven member, as a shaft, arranged coaxially with the driving element, operator controlled clutch means and automatically operated clutch means between the driving element and said member or shaft, the operator controlled means being normally engaged to transmit all the motion of the driving element to such member or shaft and the automatic clutch means being normally engaged and operable to yieldingly transmit the motion to said member or shaft or to equalize the power delivered to said member or shaft when the driving force is greater than can be received or utilized by said member or shaft.

The automatic clutch or equalizing means is annular in form and preferably arranged concentric with the axis of the clutch and comprises coacting annular cams having complemental spiral or cam faces, one of such cams being rotatable relatively to said member or shaft and the other being rotatable with such member or shaft, and one being movable axially during relative rotative movement of the cams and means is provided for tending to hold the cams in engagement and yieldingly resisting relative rotative movement thereof, such means being preferably a spring.

More specifically, the clutch comprises driving and driven elements including portions here shown as disks, shiftable axially into and out of engagement and being normally held in engagement for transmitting all of the power of the driving element to the driven element and one of these elements here illustrated is the driven element including driving and driven concentric members normally rotatable as a unit and automatic clutch or equalizing means built into the clutch construction and arranged concentric with the axis of the clutch and near the axis of the clutch to effect an equalizing action or lost motion between such driving and driven members when the driving force is greater than can be immediately received or utilized by the driven member or shaft.

The clutch itself may be of any suitable form, size and construction, that here illustrated being of the friction disk type including a driving element 1, which is usually the flywheel of the engine of the vehicle, the driving element being formed with a drum 2 on its rear side which incloses a cylindrical cavity concentric with the axis of the clutch, and a driven element 3 comprising driving and driven parts or members, the driving member or part 3 coacting with the driving element and the driven part being a shaft 4 on which the driving member 3 is mounted, the shaft 4 being arranged coaxially with the flywheel 1 and the drum 2, and having a pilot bearing 5 in the driving element 1. The driving member 3 is here shown as a spider having a hub 6 on the shaft 4, this hub being mounted to rotate about the shaft, the driving part 3 also including arms 7 extending parallel to the shaft 4 and to the inner face of the drum 2 and these arms are connected to the hub in any suitable manner as by rivets 8 extending through lapping flanges 9, 10 on the arms 7 and on the hub 6.

11, 12 are the usual annular portions or interleaved friction disks, the disks 11 being slidably keyed to the drum and the disks 12 slidably keyed to the arms 7. The arms 7 are also formed at their inner ends with an abutment 13 against which the disks are compressed by the clutch spring 14. The spring 14 is here illustrated as located within the member 3 and as thrusting at one end against the flange 9 of the arms 7 and at its other end against an annular spring abutment 15, the latter being connected by means of bolts or tie rods 16 to a compression plate 17, which compresses the disks 11, 12 toward the abutment 13.

The plate 17 is suitably connected to a collar 18 slidable axially on the shaft 4, this collar being shifted by the usual yoke 19, which is connected to an operating lever or pedal. The construction of the clutch, thus far described, forms no part of this invention with the exception that the hub 6 is rotatably mounted on the shaft 4 instead of being keyed thereto.

The automatic equalizing means, or means for permitting lost motion in the clutch when the driving force is greater than the force that can be received or utilized by the shaft 4, as when the power is suddenly applied, is arranged concentric with the axis of the clutch and preferably about such shaft within the member 3 of the driven element and the drum 2. This means, as here illustrated, comprises opposing sleeves or cams arranged end to end, one of which is slidable axially on the shaft 4, and one of which is keyed to the shaft, and a spring coiled about the shaft tending to resist axial movement of the shiftable cam. The hub 6 constitutes one of the cams, which hub, as before stated, is rotatable about the shaft 4. 20 designates the other cam or sleeve, it being splined or keyed to the shaft 4 and slidable axially thereof. The cam faces 21, 22 on the abutting ends are usually spiral.

23 is a spring resisting axial movement of the cam 20, this spring being coiled about the shaft and thrusting at one end against the cam 20, and at its other end against an adjustable spring abutment 24, threading on the reduced outer portion 25 of the shaft 4 and held in its adjusted position in any suitable manner, as by a key 26.

The hub or cam 6 is held from axial movement by a thrust bearing here illustrated as a collar 27 on the shaft, this collar thrusting against a shoulder as a washer 28 seated in an annular groove 29 in the shaft 4 and in an annular recess in the rear side of the collar 27. The collar 27 is keyed to the shaft in order to rotate therewith, and, as here shown, some of the splines 30, which interlock the cam 20, are extended at 31 to take into keys on the collar 27. The hub or cam 6 rides on the apices of these extensions 31 or preferably on a bushing enclosing the apices of the spline extensions 31.

In operation, when the driving force is greater than can be received by the shaft 4, the cam surface 21 rides up the incline of the cam surface 22, thus causing lost motion between the member 3 of the clutch and the shaft 4 while the cam 20 is being shifted axially against the spring 23. Preferably the cam faces extend through arcs of nearly 360 degrees thereby allowing nearly an entire revolution of the member 3 relatively to the shaft 4. In order to limit the axial movement of the cam 20, means is provided for limiting the axial shifting of the cam 20, this means consisting of a shoulder 31 at the inner end of the spring abutment 24.

As in motor vehicles, the shaft 4 always rotates in one direction regardless of whether the vehicle is traveling forwardly or rearwardly, it is unnecessary that cam faces be provided for relieving the torque except in one direction. However, it may be desirable to provide lost motion or equalizing effect when shaft 4 is acting as a driver, as when coasting with the engine dead or with the clutch out and the resistance of the engine becomes greater than the driving effect of the shaft 4, or the clutch is engaged suddenly, so that a braking force is suddenly applied to the shaft 4. To meet this condition, the faces of each of the cams 6 and 20 may be of an arc of 180 degrees or less, that is, each cam may be provided with oppositely inclined cam faces.

Or, as seen in Figures 5 and 6, an additional cam 35 may be interposed between the cams 36 and 37, which correspond to the cams 6 and 22, the cams 36 and 37, having similar, instead of complemental cam faces extending through arcs of nearly 360 degrees and the intermediate floating cam 35 has cam faces on its opposite ends complemental to the faces of the cams 36 and 37. The intermediate cam 35 floats or rotates freely on the driven shaft 40. In operation, the driving motion of the driven member of the clutch to the cam 36 causes the cam 35 to rotate as a unit with the cam 36 and this cam 35 may, if necessary, slip or rotate relatively to the cam 37 keyed to the driven shaft 40 and effect an axial shifting of the cam 37 during such slipping movement against the action of the equalizing spring. However, when the shaft 40 acts as a driver, the intermediate cam 35 rotates with the cam 37 keyed to the shaft 40 and lost motion takes place between the intermediate cam 35 and the cam 36.

This clutch is particularly advantageous in that it relieves the engine, the transmission, the propeller shaft, the axles and the wheels of the sudden application of power and, hence, prevents the development of looseness between the axles and the gears of the differential and relieves the tires of the shock of sudden starts and stops.

The clutch is further advantageous in that this equalizing or shock absorbing means is embodied therein and located concentric with the driven shaft and is assembled with the other parts of the clutch without affecting the form, size and construction thereof.

What I claim is:

1. In a clutch, the combination of driving and driven elements, the driven element including a shaft arranged coaxially with the driving element, a member having a hub mounted on the shaft to rotate about the same, operator controlled engageable and disengageable clutch means between said member and the driving element, said clutch means being normally engaged to transmit all the motion of the driving element to said member, and yielding clutch means between said member and the shaft comprising cams mounted on the shaft and having complemental spiral faces on their opposing ends, one of said cams being rotatable with said member and the other being rotatable with the shaft and shiftable axially thereof and a spring for resisting the axial shifting of said member, said cams being located on the shaft between the hub of said member and the driving element.

2. In a clutch, the combination of a driving element, a shaft arranged coaxially with said element, a motion transmitting member mounted on the shaft to rotate about the same, the driving element and said member having annular coacting friction clutch means, said clutch means being operator controlled and normally engaged to transmit all the motion of the driving element to said member, a pair of cams mounted on the shaft between the motion transmitting member and the driving element, said cams having coacting spiral cam faces on their abutting ends, one cam being rotatable with the motion transmitting member and the other rotatable with the shaft and slidable axially thereof and a spring for resisting such sliding movement.

In testimony whereof, I have hereunto signed my name, at Syracuse, in the county of Onondaga, and State of New York this 25th day of May, 1923.

CHARLES B. SPASE.